United States Patent [19]
Peltz et al.

[11] Patent Number: 5,919,852
[45] Date of Patent: Jul. 6, 1999

[54] LOW SMOKE, FLAME RETARDANT, VDF POLYMERS

[75] Inventors: John H. Peltz, Glenolden; Glenn H. Price, Reading, both of Pa.

[73] Assignee: Elf Atochem North America, Inc., Philadelphia, Pa.

[21] Appl. No.: 08/090,676

[22] Filed: Jul. 13, 1993

[51] Int. Cl.$^6$ .............. C08K 3/18; C08K 3/10; C08K 3/22
[52] U.S. Cl. ................................................ 524/406
[58] Field of Search .............................. 524/406

[56] References Cited

U.S. PATENT DOCUMENTS

| | | | |
|---|---|---|---|
| 4,585,703 | 4/1986 | Taguchi et al. | 428/446 |
| 4,696,989 | 9/1987 | Oke et al. | 526/254 |
| 4,898,906 | 2/1990 | Hannecart | 524/406 |

*Primary Examiner*—Paul Thibodeau
*Assistant Examiner*—Dlawrence Tarazano
*Attorney, Agent, or Firm*—Stanley A. Marcus; William D. Mitchell

[57] ABSTRACT

Calcium tungstate modified, VDF polymers having a reduced smoke-generating capability upon ignition and an increased resistance to ignition.

4 Claims, No Drawings

LOW SMOKE, FLAME RETARDANT, VDF POLYMERS

BACKGROUND OF THE INVENTION

The present invention relates to vinylidene fluoride ("VDF") polymers having a reduced smoke-generating capability upon ignition and having an increased resistance to ignition (limiting oxygen index or "LOI"), particularly to compositions containing VDF polymers having calcium tungstate dispersed therein.

One of the notable characteristics of fluorinated polymers is their relatively low susceptibility to burning and the low level of smoke generated in such situations as compared with other polymers. This characteristic has been utilized in the wire and cable industry, among others, and more specifically in plenum cable constructions and fiber optic cable applications. Fluoropolymers have LOI values ranging from the 40's to the 90's, as determined by ASTM D-2863, with the higher index numbers being achieved by the least flammable polymers. Polyvinylidene fluoride (PVDF) based resins normally have LOI values in the lower end of that range. Thus, reducing the smoke density and increasing the flame retardancy of the VDF polymers is a desirable goal. The cable constructions would then exhibit a greater tolerance to the inclusion of non-fluorinated components.

Other candidates have been tried for enhancing flame retardation and reduced smoke, such as kaolin clay (U.S. Pat. No. 4,804,702), but are only moderately successful. An improved retardant is highly desirable. The text of U.S. Pat. No. 4,804,702 is incorporated herein by reference for its teaching of typical cable constructions employing such VDF polymers.

SUMMARY OF THE INVENTION

A low smoke and flame retardant composition comprising a VDF polymer and from about 0.02 to about 2.00 percent by weight of calcium tungstate, based on the weight of the composition, is provided, the polymer optionally containing other additives such as polytetrafluoroethylene ("PTFE").

DETAILED DESCRIPTION OF THE INVENTION

It has now been found that incorporation of a small amount of calcium tungstate into a VDF polymer results in a significant improvement in the smoke and flame properties of the polymer, making it especially useful for cable constructions.

The "VDF polymer" refers not only to the homopolymers of VDF but also to the copolymers prepared from at least about 80% by weight of VDF monomer. Comonomers may include other fluorinated monomers such a: hexafluoropropylene ("HFP"), tetrafluoroethylene ("TFE"), and vinyl fluoride. Preferred are the homopolymers and the copolymers prepared from VDF and HFP to which small amounts (up to about 5 weight percent, preferably about 0.01 to about 0.05 weight percent) of PTFE may be added. Minor amounts of other conventional additives, such as calcium carbonate, may also be added.

The preferred VDF polymer resins are those having a melt viscosity (according to ASTM D3835) in the range of from about 13 to about 27 Kp (kilopoise) at a shear rate of 100 $sec^{-1}$ and a temperature of 232 degrees Centigrade ("232 C."). Examples of such polymers include Elf Atochem's KYNAR 2821 (a copolymer prepared from VDF and HFP which has a melt viscosity of 17–20 Kp); KYNAR 2851 (a copolymer prepared from VDF and HFP with a melt viscosity of 20–23 Kp); and KYNAR 741 (a PVDF homopolymer).

The VDF polymer is blended with about 0.02 to 2.0 weight percent calcium tungstate, more typically about 0.07–1.5%, preferably about 0.5–1.5%. The additive(s) can be blended into the polymer using conventional polymer milling and mixing equipment so as to provide a good dispersion of the additive(s) in the base polymer. A Brabender mixer was used in the examples, using a mixing temperature of about 225 C. A powdered, synthetic calcium tungstate of high purity is preferred, such as is available commercially from the Chem-Met Company.

In the examples the LOI test follows ASTM D 2863.

For the Light Transmission test ANSI/ASTM D 2843 was used with a modified smoke chamber wherein light transmission was recorded rather than smoke index. No blower was used. The vacuum necessary to draw smoke through the light beam was accomplished by a vented hood. No background sign was used to observe smoke. Higher light transmission numbers indicate reduced smoke.

Test results for three formulations of the invention (1B, 2B, and 3) are reported in TABLE I below, as are results for two comparative formulations with no calcium tungstate, Comp. 1A, and with a kaolin additive as taught in the prior art, Comp. 2A. In each of the comparative tests the VDF polymer shows enhanced LOI and light transmission properties with the addition of calcium tungstate. "CT" indicates calcium tungstate. "LT" indicates Light Transmission.

TABLE I

| Example | Composition | LOI | LT |
|---|---|---|---|
| Comp. 1A | KYNAR 741 | 46 | 56% |
| 1B | KYNAR 741 with 0.6% CT | 86 | 97% |
| Comp. 2A | KYNAR 2900 [KYNAR 2821 with 0.8% Kaolin Clay, 0.09% calcium carbonate & 0.02% PTFE] | 90–95 | 90–92% |
| 2B | KYNAR 2900 with 1% CT | 100 | 98% |
| 3 | KYNAR 2821 with 0.6% CT & 0.02% PTFE | 90–95 | 95–97% |

What is claimed is:

1. A low smoke and flame retardant composition comprising a vinylidene fluoride polymer and from about 0.02 to about 2.0 percent by weight of said composition of calcium tungstate.

2. A composition as in claim 1 containing up to about 5% by weight of polytetrafluoroethylene.

3. A composition as in claim 1 wherein the vinylidene fluoride polymer is a copolymer of vinylidene fluoride and hexafluoropropylene.

4. A composition as in claim 3 where the calcium tungstate is present in an amount of from about 0.5 to about 1.5% by weight of said composition.

* * * * *